United States Patent

Tamura et al.

[11] Patent Number: 5,885,081
[45] Date of Patent: Mar. 23, 1999

[54] SYSTEM AND METHOD FOR CONVERSION BETWEEN LINGUISTICALLY SIGNIFICANT SYMBOL SEQUENCES WITH DISPLAY OF SUPPORT INFORMATION

[75] Inventors: Shinko Tamura; Shin-Ichiro Kamei, both of Tokyo, Japan

[73] Assignee: NEC Corporation, Tokyo, Japan

[21] Appl. No.: 577,910

[22] Filed: Dec. 4, 1995

[30] Foreign Application Priority Data

Dec. 2, 1994 [JP] Japan ............... 6-299998

[51] Int. Cl.$^6$ ............... G09B 5/00; G09B 19/06
[52] U.S. Cl. ............... 434/169; 434/157; 704/2
[58] Field of Search ............... 434/156, 157, 434/167, 169; 704/1–10

[56] References Cited

U.S. PATENT DOCUMENTS

| | | | |
|---|---|---|---|
| 4,542,478 | 9/1985 | Hashimoto et al. | 703/6 |
| 4,774,666 | 9/1988 | Miyao et al. | 704/2 |
| 4,787,038 | 11/1988 | Doi et al. | 704/2 |
| 5,295,070 | 3/1994 | Justice | 704/2 |

FOREIGN PATENT DOCUMENTS

| | | |
|---|---|---|
| 3-085677 | 4/1991 | Japan . |
| 3-142558 | 6/1991 | Japan . |
| 3-160555 | 7/1991 | Japan . |
| 4-52957 | 2/1992 | Japan . |
| 5-204960 | 8/1993 | Japan . |
| 5-314172 | 11/1993 | Japan . |
| 6-52164 | 2/1994 | Japan . |
| 6-231164 | 8/1994 | Japan . |

OTHER PUBLICATIONS

Ward, Adele; Translations by PC; Credit Control (vol. 13, No. 6, pp. 20–23), Jun. 1992.

*Primary Examiner*—Robert A. Hafer
*Assistant Examiner*—John Edmund Rovnak
*Attorney, Agent, or Firm*—Foley & Lardner

[57] ABSTRACT

A support information and spelling variation display set-up section serves for setting up in advance a plurarity of kinds of spelling variations such as of conjugations respectively for conversion result candidates as well as a plurality of kinds of support information that a user may desire to reference for the conversion result candidates, cooperating with a support information and spelling variation display direction unit, which accepts a command for designating a kind of support information or a kind of spelling variation and a command for directing a display thereof, and a conversion result selection and decision unit, which accepts a command for a direction of a selection and a decision of a conversion result, permitting the user to voluntarily reference one of the support information and the spelling variations for a plurality of candidates, any time when desired, effectively reducing a burden to reference a dictionary in preparation of a sentence.

20 Claims, 20 Drawing Sheets

| CANDIDATES FOR CONVERSION RESULTS | PARTS OF SPEECH | | MEANING | | EXEMPLARY SENTENCES |
|---|---|---|---|---|---|
| 見る (MI-RU) | see | Verb | 見える | (MIERU) | I see the man over there. |
| | observe | Verb | 観察する | (KANSATSU-SURU) | The student observed the frog's behavior. |
| | check | Verb | 検査する | (KENSA-SURU) | He checked the names of the list. |
| | read | Verb | 読む | (YO-MU) | The boss read his report. |
| | observation | Noun | 観察する | (KANSATSU-SURU) | a meteorogical observation. |

| | CONJUGATED FORMS |
|---|---|
| check (V) | check,checks,checked,checked,checking |
| observe (V) | observe,observes,observed,observed,observing |
| observation (N) | an observation,observations,the observation,the observations |
| read (V) | read,reads,read,read,reading |
| see (V) | see,sees,saw,seen,seeing |

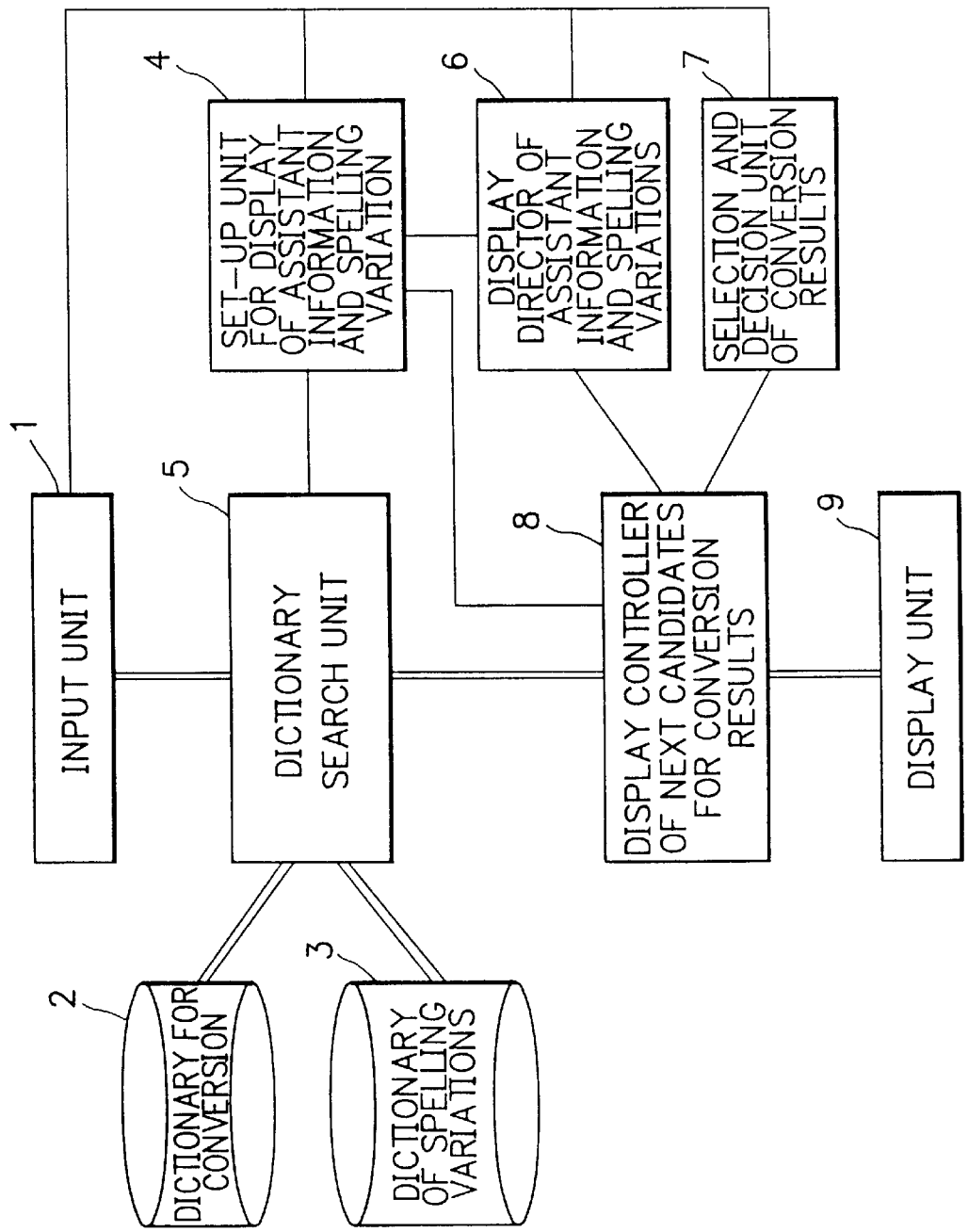

FIG. 2

| CANDIDATES FOR CONVERSION RESULTS | PARTS OF SPEECH | MEANING | EXEMPLARY SENTENCES |
|---|---|---|---|
| see | Verb | 見える (MIERU) | I see the man over there. |
| observe | Verb | 観察する (KANSATSU-SURU) | The student observed the frog's behavior. |
| check | Verb | 検査する (KENSA-SURU) | He checked the names of the list. |
| read | Verb | 読む (YO-MU) | The boss read his report. |
| observation | Noun | 観察する (KANSATSU-SURU) | a meterogical observation. |

見る (MI-RU)

F I G. 3

| | CONJUGATED FORMS |
|---|---|
| check (V) | check,checks,checked,checked,checking |
| observe (V) | observe,observes,observed,observed,observing |
| observation (N) | an observation,observations,the observation,the observations |
| read (V) | read,reads,read,read,reading |
| see (V) | see,sees,saw,seen,seeing |

F I G. 4

ASSISTANT INFORMATION

| | | |
|---|---|---|
| Parts of Speech | ○ always display | ● display when directed | ○ not display |
| Meaning | ● always display | ○ display when directed | ○ not display |
| Exemplary Sentences | ○ always display | ○ display when directed | ● not display |

SPELLING VARIATIONS

| | | |
|---|---|---|
| Conjugated Forms | ○ always display | ● display when directed | ○ not display |

FIG. 5

| | CANDIDATES FOR CONVERSION RESULTS | PARTS OF SPEECH | MEANING | CONJUGATED FORMS |
|---|---|---|---|---|
| 見る (MI-RU) | see | Verb | 見える (MI-ERU) | see<br>sees<br>saw<br>seen<br>seeing |
| | observe | Verb | 観察する (KANSATSU-SURU) | observe<br>observes<br>observed<br>observed<br>observing |
| | check | Verb | 検査する (KENSA-SURU) | check<br>checks<br>checked<br>checked<br>checking |
| | read | Verb | 読む (YO-MU) | read<br>reads<br>read<br>read<br>reading |
| | observation | Noun | 観察 (KANSATSU) | an observation<br>observations<br>the observation<br>the observations |

FIG. 11 voir

| see |
| Voir [general meaning] |
| comprendre [to understand] |
| apprendre [to learn] |
| connaître [to know] |
| conduire [to accompany] |

FIG. 12 comprends

| see |
| voir [general meaning] |
| comprendre [to understand] |
| apprendre [to learn] |
| connaître [to know] |
| conduire [to accompany] |

| [je] comprends |
| [tu] comprends |
| [il,elle] comprend |
| [nous] comprenons |
| [vous] comprenez |
| [ils,elles] comprennent |

F I G. 13 comprends
| |
|---|
| see |
| voir [general meaning] |
| comprendre [to understand] |
| apprendre [to learn] |
| connaître [to know] |
| conduire [to accompany] |

| |
|---|
| [je] comprends |
| [tu] comprends |
| [il,elle] comprend |
| [nous] comprenons |
| [vous] comprenez |
| [ils,elles] comprennent |

| |
|---|
| [je] comprends [Present] |
| [je] comprendrai [Future] |
| [je] comprenais [Imperfect] |
| [j'] ai compris [Compound past] |
| [je] compris [Past historic] |
| [que je] comprenne [Present subjunctive] |
| comprenant [Present participle] |
| compris [Past participle] |

F I G. 14 comprends

| | |
|---|---|
| see | |
| voir | [general meaning] |
| comprendre | [to understand] |
| apprendre | [to learn] |
| connaître | [to know] |
| conduire | [to accompany] |

| |
|---|
| [Present] [je] comprends |
| [Future] [je] comprendrai |
| [Imperfect] [je] comprenais |
| [Compound past] [j'] ai compris |
| [Past historic] [je] compris |
| [Present subjunctive] [que je] comprenne |
| [Present participle] comprenant |
| [Past participle] compris |

F I G. 15

| comprends | |
|---|---|
| see | |
| voir | [general meaning] |
| comprendre | [to understand] |
| apprendre | [to learn] |
| connaître | [to know] |
| conduire | [to accompany] |

| [Present] [je] comprends | |
|---|---|
| [Future] [je] comprendrai | |
| [Imperfect] [je] comprenais | |
| [Compound past] [j'] ai compris | |
| [Past historic] [je] compris | |
| [Present subjunctive] [que je] comprenne | |
| [Present participle] comprenant | |
| [Past participle] compris | |

| [je] comprends | |
|---|---|
| [tu] comprends | |
| [il, elle] comprend | |
| [nous] comprenons | |
| [vous] comprenez | |
| [ils, elles] comprennent | |

F I G. 16
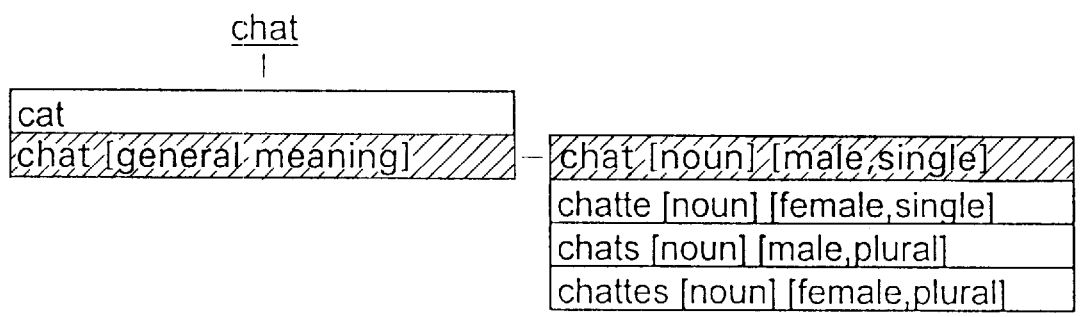

F I G. 17 comprendre

| see |
| voir [general meaning] |
| comprendre [to understand] |
| apprendre [to learn] |
| connaître [to know] |
| conduire [to accompany] |

F I G. 18 comprends

| see |
| voir [general meaning] |
| comprendre [to understand] |
| apprendre [to learn] |
| connaître [to know] |
| conduire [to accompany] |

| [je] comprends |
| [tu] comprends |
| [il, elle] comprend |
| [nous] comprenons |
| [vous] comprenez |
| [ils, elles] comprennent |

F I G. 19 comprendras

| see |
| voir [general meaning] |
| comprendre [to understand] |
| apprendre [to learn] |
| connaître [to know] |
| conduire [to accompany] |

| [je] comprends |
| [tu] comprends |
| [il, elle] comprend |
| [nous] comprenons |
| [vous] comprenez |
| [ils, elles] comprennent |

| [tu] comprends [Present] |
| [tu] comprendras [Future] |
| [tu] comprenais [Imperfect] |
| [tu] as compris [Compound past] |
| [tu] compris [Past historic] |
| [que tu] comprennes [Present subjunctive] |
| comprenant [Present participle] |
| compris [Past participle] |

F I G. 20 comprendrai

| see |
|---|
| voir [general meaning] |
| comprendre [to understand] |
| apprendre [to learn] |
| connaître [to know] |
| conduire [to accompany] |

| [Present] [je] comprends |
|---|
| [Future] [je] comprendrai |
| [Imperfect] [je] comprenais |
| [Compound past] [j'l ai compris |
| [Past historic] [je] compris |
| [Present subjunctive] [que je] comprenne |
| [Present participle] comprenant |
| [Past participle] compris |

FIG. 21 comprend

| see | |
|---|---|
| voir | [general meaning] |
| comprendre | [to understand] |
| apprendre | [to learn] |
| connaître | [to know] |
| conduire | [to accompany] |

| [Present] | [je] comprends |
|---|---|
| [Future] | [je] comprendrai |
| [Imperfect] | [je] comprenais |
| [Compound past] | [j'] ai compris |
| [Past historic] | [je] compris |
| [Present subjunctive] | [que je] comprenne |
| [Present participle] | comprenant |
| [Past participle] | compris |

| [je] comprends |
|---|
| [tu] comprends |
| [il,elle] comprend |
| [nous] comprenons |
| [vous] comprenez |
| [ils,elles] comprennent |

5,885,081

SYSTEM AND METHOD FOR CONVERSION BETWEEN LINGUISTICALLY SIGNIFICANT SYMBOL SEQUENCES WITH DISPLAY OF SUPPORT INFORMATION

BACKGROUND OF THE INVENTION

The present invention generally relates to a symbol sequence conversion system with a displaying subsystem and a symbol sequence conversion method with a displaying step, and particularly, to a system and a method for a conversion between linguistically significant symbol sequences including a display of support information for supporting an interacting operator.

DESCRIPTION OF THE RELATED ART

Recent years have observed a rapid spread of an office work mechanization, accompanying an increasing need for a computer-assisted implementation (e.g. an English to French translation machine or a Japanese word processor) which is adaptive to a service by an entity (e.g. a translation company or an office worker) for a conversion between a pair of below-described symbol sequences.

One is a linguistically significant symbol sequence (hereafter sometimes "original symbol sequence" or "input symbol sequence"), e.g. an English sentence or a Japanese sentence by a ROHMA-JI (i.e. alphabetical) notation, that may have been prepared by the entity with a relatively small amount of efforts.

The other is another linguistically significant symbol sequence (hereafter sometimes "equivalent symbol sequence" or "converted symbol sequence"), e.g. a French sentence or a Japanese sentence by HIRA-KANA and KATA-KANA letters (hereafter collectively "KANA letters") and KAN-JI characters, that has a substantially identical linguistic significance to the original symbol sequence and that otherwise might have been prepared by the entity with a greater amount of efforts.

The equivalent symbol sequence as well as the original symbol sequence is merely required to be a linguistically significant sequence (hereafter simply "symbol sequence") of subsets of a set of linguistically significant combinations of symbols including any and all letters (numerals inclusive), characters and linguistic symbols (a spacing inclusive) employable for a visual notation in any and all natural languages.

The equivalent symbol sequence as well as the original symbol sequence may be an entirety or an arbitrary or concerned subsequence of a mother symbol sequence that may comprise a number of sentences or a single-element sequence such as of a character.

For such the implementation, there have been proposed a variety of symbol sequence conversion systems of a dialog type including a displaying subsystem for displaying either or both of input and converted symbol sequences.

More specifically, the displaying subsystem is controlled to display, in a set or groups or in a menu-selective manner and in an automatic or command-responding manner, one or more converted symbol sequences as an acknowledgeable (such as by simply entering a subsequent conversion), rejectable (such as by a deletion) and/or overwritable highest-order candidate and/or selectable and/or rejectable (such as by reading a substitute) next-order or lower-order candidates (hereafter collectively "candidate") for a definite symbol sequence.

An interacting operator is thus responsible for providing a command representative of a decisive acknowledgment or selection (hereafter collectively "selection") or a decisive rejection combined with a subsequent selection and/or an overwrite operation, hereafter collectively "decision", to have a resultant symbol sequence as the definite.

For an efficient decision, it is desirable to support the operator by providing available information (hereafter "support information").

In this respect, an improved symbol sequence conversion system (hereafter "first conventional system") has been disclosed in the Japanese Patent Application Laid-Open Publication No. 3-85677.

The first conventional system is operative in a translation process thereof to translate an input sentence (e.g. such that:

"彼の[KARE-NO=His] 会社は[KAISHA-HA=company] 乗用車だけでなく、トラックも[JOUYOUSHA DAKE DE-NAKU TORAKKU-MO=trucks as well as cars] 貸し[KA-SI=rent*] ている。[TE-IRU=*s.]")

as an original symbol sequence in native language (e.g. in Japanese) including a multivocal word (e.g. such that:

"貸し[KA-SI]" which is a conjugation of "貸す[KA-SU=to lend, to rent, to loan, etc.]"), as a stored dictionary has a plurality of ordered equivalent words in foreign language (e.g. in English) each combined with a corresponding critical remark in native language (e.g. such that:

"1. lend"+"無料で[MURYOU-DE=in free of charge]"
"2. rent"+"有料で[YUURYOU-DE=at a charge]"), by using a top-ordered equivalent word (e.g. "1. lend") for the multivocal word, to thereby generate an indefinite equivalent sentence in foreign language (e.g. such that:

"His company lends trucks as well as cars."

with a conjugated "2. rents" concealed as well as the remarks) as a first converted symbol sequence including an indefinite word consisting of the top-ordered equivalent word (e.g. "lends"), as it is conjugated when applied.

The first conventional system is further operative in an editing process following the translation process to display the indefinite equivalent sentence, highlighting the indefinite equivalent word, before responding to a display command from an interacting operator, who has operated a cursor to put on the highlighted word, to display the respective equivalent words as candidates for a definite equivalent word together with their remarks as support information (e.g. such that:

"貸す": 1 lends "無料で貸す"
2 rents "有料で貸す"), permitting the operator to reference the remarks to select one (e.g. "rents") of the candidates, thereby having a definite equivalent sentence (e.g. such that:

"His company rents trucks as well as cars.")

as a second converted symbol sequence in foreign language.

Therefore, the first conventional system permits an interacting operator to manage to translate an input sentence in his or her native language into a definite equivalent sentence in a foreign language so long as a stored dictionary can cover, even if the operator had little linguistic faculty on this language.

The system might be all-mighty with a complete dictionary covering any and all criteria between any and all words, as they were applicable to any and all circumstances.

However, the dictionary is an artificial one stored in a limited capacity of memory, so that a resultant symbol sequence may be a stereotype.

Moreover, some probable users with a linguistic talent trained to a certain level may rather want to know a practice in which a concerned foreign language word is used.

In this respect, another improved symbol sequence conversion system (hereafter "second conventional system") has been disclosed in the Japanese Patent Application Laid-Open Publication No. 5-204960.

The second conventional system is operative in a translation process thereof to translate an input sentence (e.g. such that:

"He runs a hotel."

which is written in a left column of an original-equivalent pairing table.) as an original symbol sequence in foreign language (e.g. in English), by using a stored dictionary, into a definite equivalent sentence (e.g. such that:

" 彼はホテルを突破した。" [KARE-HA HOTERU-WO TOPPA-SITA$_o$=He broke through a hotel.]

which is written in a right column of the original-equivalent pairing table, as it is displayed.) as a first converted symbol sequence in native language (e.g. in Japanese).

An interacting operator may consider the definite sentence unnatural, doubting if a displayed native word (e.g.:

"突破した" [T0PPA-SITA=broke through])

was an inadequate equivalent to a certain foreign word (e.g. "run") that he or she could guess.

Then, in an editing process after the translation process, the operator can keyboard the foreign word, so the system responds thereto to retrieve a number of stored equivalent words thereto (e.g. such that:

1. "突破する" [TOPPA-SURU=to break through];
2. "競争させる" [KYOUSOU-SA-SERU =to bring into competition]; and
3. "経営する" [KEIEI-SURU=to manage]), as they are each associated in the dictionary with a corresponding example of use in a form of a phrase in foreign language in combination with an equivalent phrase thereto in native language (e.g. such that:

1. "突破する" [TOPPA-SURU=to break through] associated with a combination of "run a blockade" and 封鎖を突破する[FUUSA-WO TOPPA-SURU];
2. "競争させる" [KYOUSOU-SA-SERU =to bring into competition] associated with a combination of "run horses" and 馬を競争させる[UMA-WO KYOUSOU-SA-SERU]; or
3. "経営する" [KEIEI-SURU=to manage] associated with a combination of "run a hotel" and ホテルを経営する[HOTERU-WO KEIEI-SURU]), to display them together as support information, permitting the operator to correct the first converted symbol sequence by keyboarding to overwrite an adequate equivalent word in native language, as necessary, to obtain another definite equivalent sentence as a second converted symbol sequence in native language (e.g. such that:

" 彼はホテルを経営した。" [KARE-HA HOTERU-WO KEIEI-SITA$_o$=He managed a hotel.]).

Accordingly, the second conventional system permits a user with a trained linguistic talent to translate an input sentence in foreign language into an elaborated equivalent sentence in native language in a facilitated manner.

To this point, most probable users may have an untrained linguistic talent as a potential faculty. They may want to refererence a digest of rules and manners in which a concerned word is conjugated or declined, as well as various equivalents of a multivocal and examples of their use.

In the conventional systems, however, an interacting operator has to reference a single kind of support information, irrespective of his or her intention.

The operator may desire to refer to other information than displayed, as a basis for selection is variable at his or her discretion and as a sequence of voluntary words have their characteristic significances, or may want to check a single candidate to a critical reference.

In such a case, he or she has to interrupt a current operation, from time to time, to have an access to a respective one of occasionally inspired reference items such as in an available database or dictionary, before fixing key points of accessed information in an arranged manner in his or her memory or memoranda for use in a restarted operation, which may be burdensome and time-consuming.

Further, in the conventional systems, support information is provided simply when a storage area of a high-lighted word is accessed or when a concerned word is keyboarded, accompanying an interruption of a process of thinking.

Some sort of information had better be displayed any time for any word, as it is requested, without an interruption of thinking.

Still less, in the conventional systems, an equivalent sentence to an entirety of an original sentence is generated before an operator enters an editing process.

The original sentence may be a combination of long and/or complicated sentences so that it may take much time for the operator to exactly guess a context associated with a concerned word, before he or she makes a decision in the first conventional system to select one of given candidates or in the second conventional system to exactly keyboard a correct word or phrase.

This conventional inconveniency may be overcome by introducing a serial conversion concept for serially converting a number of individual subsequences of an original symbol sequence into a number of ordered subsequences of an equivalent symbol sequence, permitting a substantially parallel elaboration of these subsequences.

However, the other conventional inconveniencies may be emphasized in a serial dialog conversion, in particular, such as from a sequence of keyboarded Japanese words consisting of e.g. ROHMA-JI or KANA letters into a Japanese sentence consisting of KANA letters and KAN-JI characters or into a foreign language.

This is because the Japanese language has no articles nor plural forms, and most Japanese sentences each permit a plurality of interpretations, as will be seen from a typical case in which a phrase is expressed by ROHMA-JI or KANA letters continuously arranged without being punctuated or spaced.

The present invention has been achieved with such points in mind.

SUMMARY OF THE INVENTION

It therefore is an object of the present invention to provide a symbol sequence conversion system and a symbol sequence conversion method for a serial dialog conversion from an original symbol sequence into an equivalent symbol sequence, permitting two or more kinds of support information to be displayed, alone or in combination, any time for any word in a controllable manner, so that an interacting operator with a potential linguistic faculty may prepare an elaborate sentence in a facilitated manner.

To achieve the object, a genus of the present invention provides a symbol sequence conversion system for sequentially converting in an interactive manner an original symbol sequence having an original linguistic significance and an original linguistic composition, the original symbol sequence including on a first set of symbol location points therein a first symbol sequence having a first linguistic significance and a first linguistic form meeting a first linguistic relationship the first set of symbol location points has to the original linguistic composition, into an equivalent symbol sequence having an equivalent linguistic significance to the original linguistic significance and a corresponding linguistic composition to the original linguistic composition, the equivalent symbol sequence including on a second set of symbol location points therein a second symbol sequence having a second linguistic significance equivalent to the first linguistic significance and a second linguistic form meeting a second linguistic relationship the second set of symbol location points has to the corresponding linguistic composition, the symbol sequence conversion system comprising: an input means for inputting the original symbol sequence and a combination of a first, a second and a third command; a first dictionary means for holding therein one or more third symbol sequences each respectively having a third linguistic significance thereof equivalent to the first linguistic significance and a third linguistic form thereof and a set of first support information relating to the third linguistic significance of a respective one of the one or more third symbol sequences; a second dictionary means for holding therein a set of second support information relating to a linguistic transformation of the respective one of the one or more third symbol sequences; a conversion means responsible to the first symbol seqeunce for retrieving the one or more third symbol sequences and preparing a fourth symbol sequence composed of a predetermined one of the retreived third symbol sequences having the third linguistic form thereof transformed into the second linguistic form, to the first command for retrieving a subset of the set of first support information of a respective one of the retrieved third symbol sequences, to the second command for retrieving a subset of the set of second support information of the respective one of the retrieved third symbol sequences, and to the third command for preparing a fifth symbol sequence composed of a selected one of the retreived third symbol sequences having the third linguistic form thereof transformed into the second linguistic form; and a display means responsible to the first symbol sequence for displaying the fourth symbol sequence as the second symbol sequence, to a combination of the first and the second command for displaying a combination of the retreived subset of first support information and the retreived subset of second support information, and to a combination of the first, the second and the third command for displaying the fifth symbol sequence as the second symbol sequence and a combination of the retreived subset of first support information of the selected one of the retrieved third symbol sequences and the retrieved subset of second support information of the selected one of the retrieved third symbol sequences.

According to the genus of the invention, an operator interacting with a symbol sequence conversion system may voluntarily set a first command (an off-state inclusive) and a second command (an off-state inclusive) to input them through an input means to the system, before or on a way of inputting an original symbol sequence, so that the system may be displaying a subsequence of an equivalent symbol sequence leading a second symbol sequence.

When a first symbol sequence is input, a conversion means responds thereto to retrieve one or more third symbol sequences and to prepare a fourth symbol sequence. The conversion means further responds to the first command to retrieve a desired subset of a set of first information on a linguistic significance of the third symbol sequences, that may include a meaning, a critical remark, an example of use, a name of part of speech, and to the second command to retrieve a desired subset of a set of second information on a linguistic transformation of the third symbol sequences, that may include a set of conjugations or declinations and/or other grammatical matters.

Then, a display means responds to the first symbol sequence to display the fourth symbol sequence as a second symbol sequence as a highest-ordered candidate, and to a combination of the first and the second command to display a combination of the retrieved subsets of first and second support information that may include a next-ordered and/or lower-ordered candidates.

The operator may input a third command for selecting one of the displayed candidates.

The conversion means responds to the third command to prepare a fifth symbol sequence. Concurrently, the display means responds to a combination of the first, the second and the third command to display a combination of the fifth symbol sequence as a second symbol sequence, i.e., the selected candidate, as it is transformed, and a combination of subsets of first and second support information corresponding thereto, that may still include other candidates.

Thereafter, the operator may select another candidate or overwrite another first symbol sequence on the concerned first symbol sequence.

It will be understood that elements of first and second symbol sequences may be continuously or randomly arranged or discretely distributed within ranges of original and equivalent symbol sequences, respectively.

Moreover, to achieve the object described, another genus of the present invention provides a symbol sequence conversion method for sequentially converting in an interactive manner an original symbol sequence having an original linguistic significance and an original linguistic composition, the original symbol sequence including on a first set of symbol location points therein a first symbol sequence having a first linguistic significance and a first linguistic form meeting a first linguistic relationship the first set of symbol location points has to the original linguistic composition, into an equivalent symbol sequence having an equivalent linguistic significance to the original linguistic significance and a corresponding linguistic composition to the original linguistic composition, the equivalent symbol sequence including on a second set of symbol location points therein a second symbol sequence having a second linguistic significance equivalent to the first linguistic significance and a second linguistic form meeting a second linguistic relationship the second set of symbol location points has to the corresponding linguistic composition, the symbol sequence conversion method comprising the steps of: inputting the original symbol sequence and a combination of a first, a second and a third command; holding in a first dictionary means one or more third symbol sequences each respectively having a third linguistic significance thereof equivalent to the first linguistic significance and a third linguistic form thereof and a set of first support information relating to the third linguistic significance of a respective one of the one or more third symbol sequences; holding in a second dictionary means a set of second support information relating to a linguistic transformation of the respective one of the one or more third symbol sequences; responding to the first symbol seqeunce for retrieving the one or more third symbol sequences and preparing a fourth symbol sequence composed of a predetermined one of the retreived third symbol sequences having the third linguistic form thereof transformed into the second linguistic form, to the first command for retrieving a subset of the set of first support information of a respective one of the retrieved third symbol sequences, to the second command for retrieving a subset of the set of second support information of the respective one of the retrieved third symbol sequences, and to the third command for preparing a fifth symbol sequence composed of a selected one of the retreived third symbol sequences having the third linguistic form thereof transformed into the second linguistic form; and responding to the first symbol sequence for displaying the fourth symbol sequence as the second symbol sequence, to a combination of the first and the second command for displaying a combination of the retreived subset of first support information and the retreived subset of second support information, and to a combination of the first, the second and the third command for displaying the fifth symbol sequence as the second symbol sequence and a combination of the retrieved subset of first support information of the selected one of the retrieved third symbol sequences and the retrieved subset of second support information of the selected one of the retrieved third symbol sequences.

Further, to achieve the object, still another genus of the invention provides a symbol sequence conversion system comprising: an input means for accepting an input of a symbol sequence; a conversion dictionary section for holding a plurality of symbol sequences, a plurality of conversion result candidates for the symbol sequences and support information relating to the conversion result candidates; a spelling variation dictionary section for holding the conversion result candidates and a plurality of spelling variations of the conversion result candidates; a support information and spelling variation display set-up section for accepting a command for a selection to or not to display the support information and the spelling variations, when displaying a conversion result next-candidate, and for holding selected results; a dictionary retrieval means responsible to the symbol sequence for a retrieval on the conversion dictionary section to have the conversion result candidates for the symbol sequences and the selected support information associated with the symbol sequences and to the conversion result candidates for a retrieval on the spelling variation dictionary section to have the selected spelling variations associated with the conversion result candidates and for holding retrieval results; a support information and spelling variation display direction means for accepting a command for designating a kind of support information or a kind of spelling variation and a command for directing a display thereof; a conversion result selection and decision means for accepting a command for a direction of a selection and a decision of a conversion result; a conversion result next-candidate display control means for responding to the selected results held by the support information and spelling variation display direction means, the command for designating the kind of support information or the kind of spelling variation and the command for directing the display thereof accepted by the support information and spelling variation display direction means, or the command for the direction of the selection and the decision of the conversion result accepted by the conversion result selection and decision means to control a display of the retrieval results held by the dictionary retrieval means; and a display means for responding to a direction from the conversion result next-candidate display control means to display the conversion result next-candidate, support information, spelling variations and the conversion results.

According to this genus of the invention, in a symbol sequence conversion system, a support information and spelling variation display set-up section serves for setting up in advance a plurarity of kinds of spelling variations such as of conjugations respectively for conversion result candidates as well as a plurality of kinds of support information that a user may desire to reference for the conversion result candidates, cooperating with a support information and spelling variation display direction means, which accepts a command for designating a kind of support information or a kind of spelling variation and a command for directing a display thereof, and a conversion result selection and decision means, which accepts a command for a direction of a selection and a decision of a conversion result, permitting the user to voluntarily reference one of the support information and the spelling variations for a plurality of candidates, any time when he or she so desires, effectively reducing a conventional burden to reference a dictionary in preparation of a sentence.

According to a species of this genus of the invention, the conversion dictionary section holds the symbol sequences, and support information including characters and foreign language equivalents to constitute conversion result candidates for the symbol sequences and meanings and exemplary sentences of the conversion results candidates, the spelling variation dictionary section holds support information including characters and foreign language equivalents held by the conversion dictionary section and spelling variations including synonyms and conjugations therefor, and the support information and spelling variation display set-up section exhibits selections to always display, to display with a command given, or not to display support information held by the conversion dictionary section and spelling variations held by the spelling variation dictionary section, when displaying the conversion result next-candidate for the input symbol sequence, and accepts a command to the selections, holding the selected results.

BRIEF DESCRIPTION OF THE DRAWINGS

The objects, features and advantages of the present invention will become more apparent from consideration of the following detailed description, in conjunction with the accompanying drawings, in which:

FIG. 1 is a block diagram of a symbol sequence conversion system according to an embodiment of the invention;

FIG. 2 is a conceptual table exemplarily showing contents of a conversion dictionary of the system of FIG. 1;

FIG. 3 is a conceptual table exemplarily showing contents of a spelling variation dictionary of the system of FIG. 1;

FIG. 4 shows an example of setting in a support information and spelling variation display set-up unit of the system of FIG. 1;

FIG. 5 shows an exemplary result of retrieval of a dictionary retrieval unit of the system of FIG. 1;

FIGS. 11 to 22 show displayed examples for two cases of an English to French conversion, in correspondence to FIGS. 6 to 9.

DESCRIPTION OF THE PREFERRED EMBODIMENTS

Figure 6:
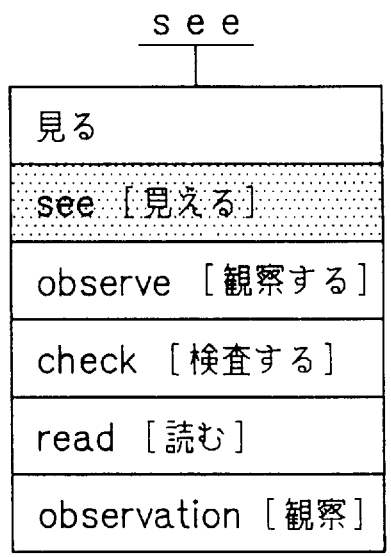
FIGS. 6 to 9 show displayed examples of conversion result next-candidates in the system of FIG. 1.

There will be detailed below preferred embodiments of the present invention, with reference to FIGS. 1 to 22.

FIG. 1 shows a symbol sequence conversion system according to an embodiment of the invention.

In FIG. 1, designated at reference character 1 is an input means as a unit for accepting an input of a first symbol sequence such as a sentence, phrase or word in Japanese ROHMAJI or KANA letters; 2 is a Japanese to English (or Japanese ROHMAJI to KANA+KANJI) conversion dictionary as a section for holding at each indexed region thereof a second symbol sequence such as a Japanese KANA+KANJI (or KANA) word in original form, one or more English (or KANA+KANJI) words as candidates for a conversion result of the second symbol sequence, and a set of support information as assistant information relating to the conversion result candidates, including for each candidate e.g. a part of speech, a meaning and an example of use; 3 is a spelling variation dictionary as a section for holding an English (or KANA+KANJI) word identical to a respective one of the conversion result candidates and a set of possible spelling variations of the word, e.g. conjugations, declinations, a double consonant, etc.; 4 is a support information and spelling variation display set-up section for exhibiting to the operator a possible selection to always display, to display upon a request from the operator, or not to display support information retrieved from the conversion dictionary 2 and spelling variations retrieved from the spelling variation dictionary 3 when displaying at least one next-candidate for the conversion result, for accepting from the operator a command on the selection, and for holding a result of thereof for each individual content of the information; 5 is a dictionary retrieval means as a search unit receiving the input symbol sequence from the input means 1 and responding thereto for a retrieval on the conversion dictionary 2 to have associated therewith conversion result candidates corresponding to the symbol sequence and support information selected for display at the support information and spelling variation display set-up section 4 by a command from the operator, as well as on the spelling variation dictionary 3 to have associated with the candidates those spelling variations selected for display at the support information and spelling variation display set-up section 4 by a command from the operator, holding results of such retrieval; 6 is a support information and spelling variation display direction means as a unit for accepting a command from the operator for designating a kind of support information or a kind of spelling variation and a command from the operator for directing a display thereof; 7 is a conversion result selection and decision means for accepting a command from the operator for a direction of a selection and a decision of a conversion result; 8 is a conversion result next-candidate display control means as a unit for responding to the results selected for a display set-up by the operator and held by the support information and spelling variation display direction means 4, the command for designating the kind of support information or the kind of spelling variation and the command for directing the display thereof accepted by the support information and spelling variation display direction means 6, or the command for the direction of the selection and the decision of the conversion result accepted by the conversion result selection and decision means 7 to control a display of the retrieval results held by the dictionary retrieval means 5; and 9 is a display means as a unit for responding to a direction from the conversion result next-candidate display control means 8 to display the conversion result next-candidate, support information, spelling variations and the conversion results.

In other words, the symbol sequence conversion system comprises an input unit 1 for inputting an original symbol sequence and operational commands of an interacting operator, a significance or vocabulary dictionary 2 having a set of assistant information (as first support information) available for a translation or conversion from the original symbol sequence into an equivalent symbol sequence as an indefinite conversion result, a grammar dictionary 3 having a set of grammartical information (as second support information) including a set of spelling variations employable for the translation, a dictionary search unit 5 for retrieving to hold therein information in the dictionaries, a display set-up control 4 for setting up a retrieved subset of the set of assistant information and a retrieved subset of the set of spelling variations in the unit 5, a display traffic control 6 as a display director or instructor for controlling a data transfer for display, a decision control 7 responsible for the input commands to control a selection of a converted result and associated decisions, a candidate display control 8 for a controlled display of next candidates for conversion results, and a display unit 9.

Respective principal units will be described. For better comprehension, it is now assumed that an original symbol sequence in Japanese (hereafter sometimes "J") is converted into an equivalent symbol sequence in English (hereafter sometimes "E").

FIG. 2 shows a storage region under an index " 見る(MIRU=to see)" in the conversion dictionary 2.

Stored information in each indexed region of the dictionary 2 comprises an index (J), a number of candidates (E) for a conversion result (i.e. equivalent word) of the index, a part of speech (E) of each candidate, a meaning (J) of each candidate and an exemplary sentence or phrase (E) of each candidate.

FIG. 3 shows a number of candidates as indices and parts of associated storage regions in the spelling variation dictionary 3.

Stored information in each indexed region of the dictionary 3 comprises an index as a candidate (E) and a set of associated spelling variations (E) such as conjugations, declinations, long consonants, etc. arranged in a separately informed order of tenses, persons, etc. Each index is provided with an indentifier for identifying a part of speech, such as V (verb) and N (noun).

FIG. 4 shows a menu (J) window for a setting to the display set-up unit 4.

For simplicity, available support information is assumed to be parts of speech, meanings and exemplary sentences in assistant information and conjugated forms in spelling variations.

An interacting operator is permitted to access any time to the menu window, directly on the display unit 9 or indirectly via an unshown keyboard of the input unit 1, and make a decision for a selection for each support information item to have the display unit 9 always display, temporarily display when so instructed, or not display the information.

According to the shown setting, the display unit 9 will always display a meaning and temporarily display a part of speech and conjugated forms and will not display exemplary sentences.

Functions of the symbol sequence conversion system will be described.

An original symbol seqeunce (J) input via the input unit 1 is sent to the dictionary search unit 5, which responds to the input symbol seqeunce (J) to serve for a retrieval on the conversion dictionary 2 to read therefrom a set of conversion result candidates (E) under indices (J) corresponding to language elements of the input symbol sequence and related assistant information of respective items selected for display by the operator at the assistant information and spelling variation display set-up unit 4, to have them element-wise associated with each other.

The dictionary search unit 5 responds to a respective one of the read candidates (E) to use it as an index for a retrieval on the spelling variation dictionary 3 to read therefrom a corresponding set of spelling variations (E) of each item selected for display by the operator at the assistant information and spelling variation display set-up unit 4, associate the corresponding set of spelling variations to the respective of candidates.

Retrieval results are stored in the dictionary search unit 5.

FIG. 5 shows an example of a set of retrieval results, as the original symbol sequence consists of a word "見る(MI-RU=to see)", for a combination of selected support information items including a part of speech, a meaning, and a set of conjugated forms. Each candidate is associated with a corresponding combination of support information items.

Then, the conversion result next-candidate display control unit 8 responds to a combination of display commands selected by the operator at the assistant information and spelling variation display set-up unit 4 to indicate the display unit 9 to display retrieval results held by the dictionary search unit 5, so that the display unit 9 displays the retrieval results in accordance with the indication of the display control unit 8.

FIG. 6 shows a displayed example of a set of conversion result next-candidates for the display setting of assistant information and spelling variations of FIG. 4, as the association of retrieval results of FIG. 5 is established with the word "見る(MI-RU=to see)" input.

The input word "見る(MI-RU)" is converted by using a top candidate into "see" as shown at a top position above a pull-down menu indexed by the input word "見る". In the pull-down menu, all associated candidates are arranged as next-candidates in rows of the menu, respectively, including the top candidate "see" in a high-lighted top row, as it is employed for the conversion. As the support information item "meaning" is selected in FIG. 4 to always display an associated meaning, each next-candidate is provided with its meaning, e.g. "見える(MI-ERU)" in the top row.

In such a situation, the operator may give the display director 7 a select command designating a kind of support information and a display command thereof. Such commands are sent from the director 7 to the control unit 8, which gives a corresponding indication to the display unit 9, which thus displays a corresponding item of support information.

Figure 7:
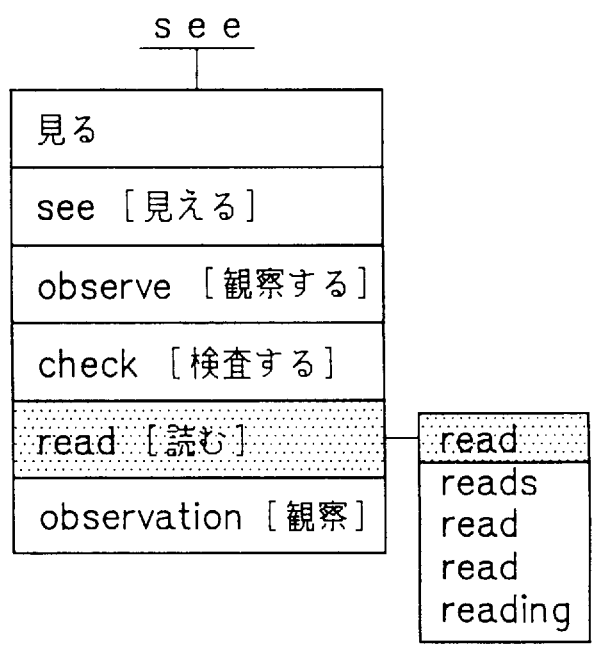

FIG. 7 shows a displayed example in such a case, as the operator has pressed a command key, having set a cursor on a displayed next-candidate "read", and sent a command for a selection of the support information item "conjugated forms".

As a result, the pull-down menu of next-candidates is high-lighted at a row displaying the candidate "read", and a subsidiary pull-down menu displays a column of conjugated forms of the candidate, high-lighting a place of a corresponding variation.

The operator may give a conversion result select command or a conversion result acknowledge command to the selection and decision unit 7. Such a command will be converted into a corresponding instruction to the display unit 9, for a corresponding display.

Figure 8:

FIG. 8 shows a displayed example for a combination of commands for a selection of a conversion result candidate and an acknowledgment thereof, as the candidate "read" is selected to be acknowledged.

As a result, the display unit 9 displays at the top place for a conversion result the selected candidate "read", high-lighting the row of "read" in the pull-down menu.

The selection and decision unit 7 can serve for accepting a conversion result selection from the menu column of spelling variations, as well as an acknowledgment thereof, to send a corresponding instruction to the display unit 9.

Figure 9:
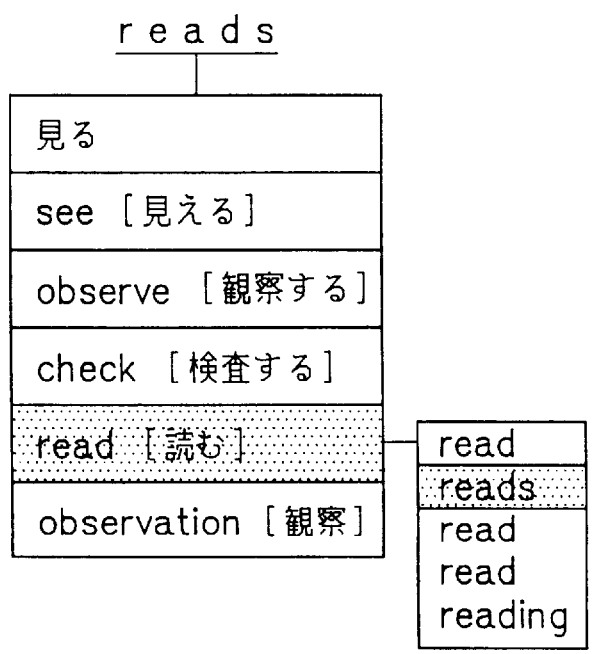

FIG. 9 shows a displayed example for a combination of commands for a selection of a conversion result from spelling variations and an acknowledgment thereof, as a spell "reads" is selected to be acknowledged.

As a result, the display unit 9 displays at the top place for conversion result the selected spell "reads", high-lighting the row of "read" and a corresponding spell "reads" in the pull-down menus.

Figure 10:
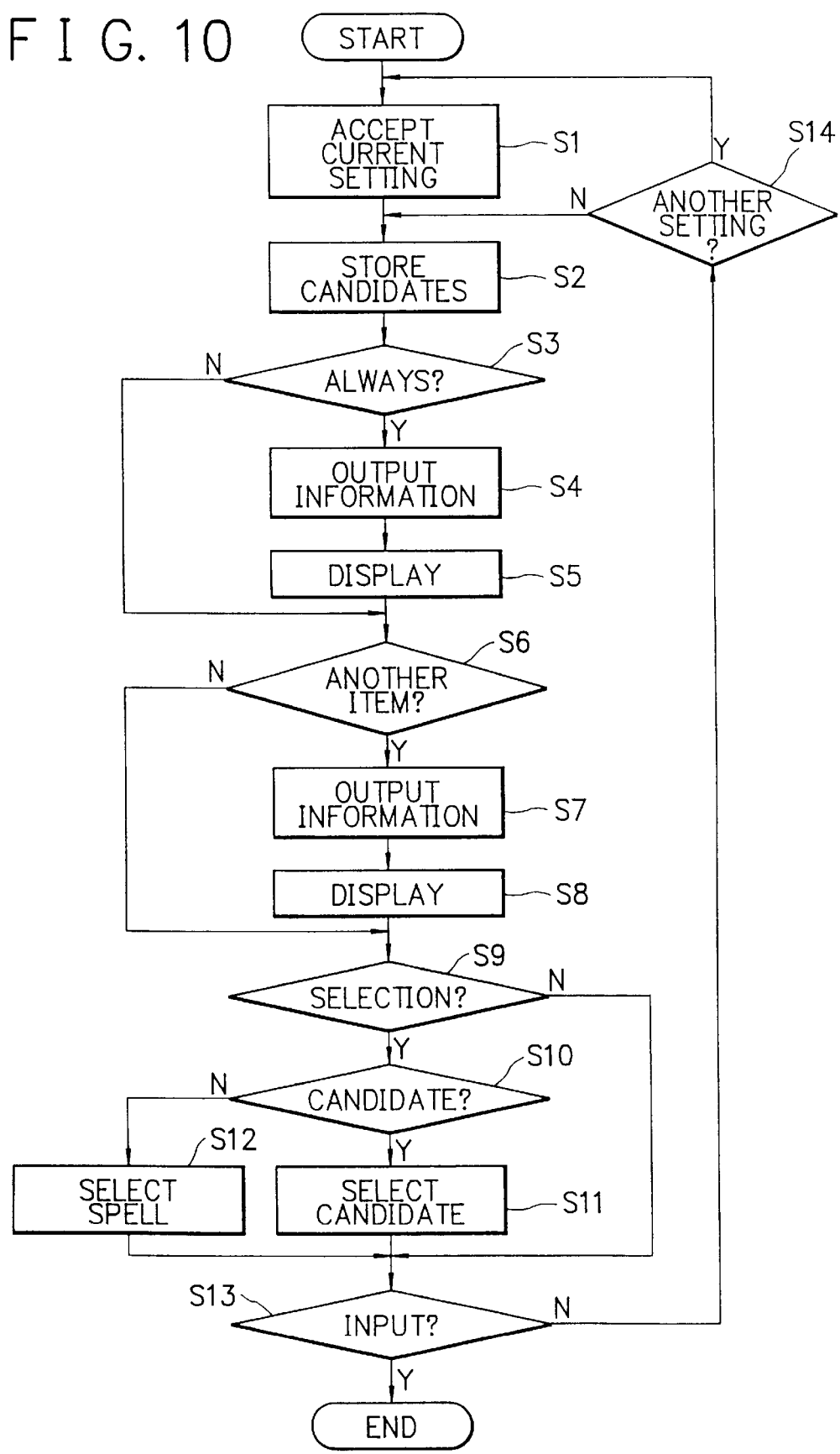
FIG. 10 is a flow chart describing control actions for displaying support information in the system of FIG. 1.
Figure 22:
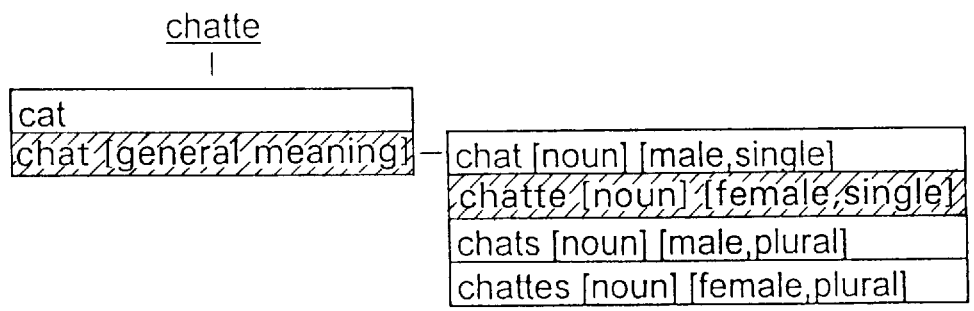

FIG. 10 shows a flow chart of control actions associated with the foregoing functions.

A step S1 accepts a current setting of a display timing for each support information item.

A subsequent step S2 stores a set of candidates for a current input symbol sequence, as well as associated support information.

Then, a decision step S3 checks if a selection is made to always display an item of support information.

If this selection is not made, the flow goes to a subsequent decision step S6.

If the concerned selection is made, the flow goes via a subsequent step S4 where the display control unit 8 outputs corresponding information to be always displayed and a still subsequent step S5 where the information is displayed, to the decision step S6.

The decision step S6 checks if a command is given to display another information item.

If this command is not given, the flow goes to a subsequent decision step S9.

If the concerned command is given, the flow goes via a subsequent step S7 where the display control unit 8 outputs corresponding information in accordance with the command and a still subsequent step S8 where the information is displayed, to the decision step S9.

The decision step S9 checks if a command is given for a conversion result selection.

If this command is not given, the flow goes to a decision step S13.

If the concerned command is given, the flow goes to a subsequent decision step S10.

The decision step S10 checks if the conversion result selection is from next-candidates.

If it is so, the flow goes via a subsequent step S11 where a candidate is selected as a conversion result, to the decision step S13.

If it is not so, the flow goes via another subsequent step S12 where a spell, such as "reads" of FIG. 9, is selected as a conversion result, to the step S13.

The decision step S13 checks if another input is detected.

If it is not so, the flow goes to an end.

If it is so, the flow goes to a subsequent decision step S14.

The decision step S14 checks if another setting is made for display timing.

If it is not so, the flow goes to the step S2.

If it is so, the flow goes to the step S1.

FIGS. 11 to 22 show displayed examples for two cases of an English to French conversion, each including as a conversion result a verb or a noun, in correspondence to FIGS. 6 to 9.

Incidentally, in the block diagram of FIG. 1, each single solid line represents a collective flow of associated control signals, and each doubled solid line represents a collective flow of associated data, which are accompanied with control signals, as necessary.

From such a view point, the symbol sequence conversion system of FIG. 1 comprises a data base 2+3, a central data processor 5 for a data acceptance, a data retrieval, a data conversion and a storage of accepted data, retrieved data and converted data, a combination of internal files 6, 7 and 8 for control actions to display a selective subset of stored data in the processor 5 in a variable display mode, an external file 4 for setting the display mode, and a dialog interface including an input unit 1 and a display unit 9.

The processor 5 is adaptive to a stepwise serial conversion in which an original sentence is stepwise converted in accordance with a linguistic composition or context thereof, e.g. in a word, phrase and/or clause mode, and a set of data associated with a respective conversion phase is stored, permitting a voluntary access thereto, as well as a voluntary reverse conversion up to the original sentence, without the need of a re-entry, so that an elaboration is facilitated.

Some examples of such the serial conversion will be described.

Example A (simple sentence)

A1. Original sentence (J): "彼女(KANOJO=she)は(WA [a Japanese auxiliary speech to be put right after a sentence subject]) 生徒(SEITO=<a>pupil<s>)を(WO [a Japanese auxiliary speech to be put right after an object]見(MI [a stem of a Japanese verb 見る<MI-RU=to see>])た(TA [a termination of a past form of the verb 見る<MIRU>]) 。(a full stop=a period)"

A2. First phase of conversion (1) Converted sentence (J+E):

"She は(WA) *pupil * (**=a cursor match mark)を(WO) see た(TA)."

(2) Support information e.g. for *-marked word: " 学生(GAKUSEI [an index as a Japanese corresponding word in a wide sense])" having thereunder candidates, e.g.:

"student [ 高校生(KOUKOUSEI)/大学生(DAIGAKUSEI)]";

"scholar [ 給費生(KYUUHISEI)]"; and

"pupil [ 高校生(KOUKOUSEI)以下(IKA=or under)]", which is high-lighted.

A3. Second phase of conversion (1) Converted sentence (E):

"* She saw a pupil.* "

(2) Support information including e.g. exemplarly probable sentences:

"she saw a student", which is high-lighted; and

"she saw with a student".

Example B (complex sentence)

B1. Original sentence,(J):

" 彼(KARE=he)は(WA) 学生(GAKUSEI=<a>student<s>) が(GA [a Japanese auxiliary speech to be put right after a contextual subject]書い(KA-I [a stem and part of conjugation of a Japanese verb 書く<<KA-KU=to write>])た(TA [an ending of a past form of the verb <<KA-KU>]) 論文(RONBUN=<a>paper<s>) 書を(WO) 読ん(YO-N [a stem and part of conjugation of a Japanese verb 読む<<YO-MU=to read>])だ(DA [an ending of a past form of the verb 読む<<YO-MU>])。"

B2. First phase of conversion (1) Converted sentence (J+E):

"He は(WA) student が(GA) write た(TA) *paper * を(WO) read だ(DA)."

(2) Support information e.g. for *-marked word:

" 論文(RONBUN [an index])" having thereunder candidates, e.g.:

"paper [ 典型(TENKEI=typical) 訳語(YAKUGO=equivalent)]", which is high-lighted;

"thesis [ 学位~(GAKUI~=~for a degree)/ 卒業~(SOTSUGYOU~=graduation~)]";

"essay [ 一般~(IPPAN~=general~)]"; and

"dissertation [ 学位~(GAKUI~=~for a degree)/ 卒業~(SOTSUGYOU~=graduation~)]".

B3. Second phase of conversion (1) Converted sentence (J+E):

"He は(WA) *a paper which a student wrote *を(WO) read だ(DA)."

(2) Support information including e.g. exemplarly probable subordinate clauses:

"a paper which a student wrote", which is high-lighted;

"a paper that a student wrote"; and

"a paper a student wrote".

B4. Third phase of conversion (1) Converted sentence (E):

"* He read a paper which a student wrote.*"

(2) Support information including e.g. an exemplarly probable sentence:

"he read a paper which a student wrote", which is high-lighted.

As will be understood from the foregoing description, the symbol sequence conversion system of FIG. 1 serves for sequentially converting in an interactive manner an original symbol sequence having an original linguistic significance and an original linguistic composition, the original symbol sequence including on a first set of symbol location points therein a first symbol sequence having a first linguistic significance and a first linguistic form meeting a first linguistic relationship the first set of symbol location points has to the original linguistic composition, into an equivalent symbol sequence having an equivalent linguistic significance to the original linguistic significance and a corresponding linguistic composition to the original linguistic composition, the equivalent symbol sequence including on a second set of symbol location points therein a second symbol sequence having a second linguistic significance equivalent to the first linguistic significance and a second linguistic form meeting a second linguistic relationship the second set of symbol location points has to the corresponding linguistic composition, and the symbol sequence conversion system comprises: an input means 1 for inputting the original symbol sequence and a combination of a first, a second and a third command; a first dictionary means 2 for holding therein one or more third symbol sequences each respectively having a third linguistic significance thereof equivalent to the first linguistic significance and a third linguistic form thereof and a set of first support information relating to the third linguistic significance of a respective one of the one or more third symbol sequences; a second dictionary means 3 for holding therein a set of second support information relating to a linguistic transformation of the respective one of the one or more third symbol sequences; a conversion means 5(+4+6+7) responsible to the first symbol seqeunce for retrieving the one or more third symbol sequences and preparing a fourth symbol sequence composed of a predetermined one of the retreived third symbol sequences having the third linguistic form thereof transformed into the second linguistic form, to the first command for retrieving a subset of the set of first support information of a respective one of the retrieved third symbol sequences, to the second command for retrieving a subset of the set of second support information of the respective one of the retrieved third symbol sequences, and to the third command for preparing a fifth symbol sequence composed of a selected one of the retreived third symbol sequences having the third linguistic form thereof transformed into the second linguistic form; and a display means 4+6+7+8+9 responsible to the first symbol sequence for displaying the fourth symbol sequence as the second symbol sequence, to a combination of the first and the second command for displaying a combination of the retreived subset of first support information and the retreived subset of second support information, and to a combination of the first, the second and the third command for displaying the fifth symbol sequence as the second symbol sequence and a combination of the retrieved subset of first support information of the selected one of the retrieved third symbol sequences and the retrieved subset of second support information of the selected one of the retrieved third symbol sequences.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A symbol sequence conversion system comprising:

an input means for accepting an input symbol sequence;

a conversion dictionary section for storing a plurality of second symbol sequences, a plurality of conversion result candidates linguistically equivalent to the plurality of second symbol sequences, and support information relating to the plurality of conversion result candidates;

a spelling variation dictionary section for storing the plurality of conversion result candidates and a plurality of spelling variations of each of the plurality of conversion result candidates;

a support information and spelling variation display set-up section for setting up a display selection of the support information and the plurality of spelling variations, and for storing the display selection;

a dictionary retrieval and storage means responsive to the input symbol sequence for retrieving, from the conversion dictionary section, corresponding ones of the plurality of conversion result candidates and related support information, and for retrieving, from the spelling variation dictionary section, ones of the plurality of spelling variations associated with the corresponding ones of the plurality of conversion result candidates, and for storing a retrieval result;

a support information and spelling variation display direction means for accepting a first user input to display the related support information or to display the ones of the plurality of spelling variations;

a conversion result selection means for accepting a second user input for selection of one of the plurality of conversion result candidates;

a conversion result display control means for accepting the display selection, the retrieval result, the first user input, and the second user input; and a display means for displaying the corresponding ones of the plurality of conversion result candidates, the related support information, the ones of the plurality of spelling variations and the selected one of the plurality of conversion result candidates in accordance with a signal from the conversion result display control means.

2. A symbol sequence conversion system according to claim 1, wherein the support information includes meanings and exemplary sentences, wherein the plurality of conversion result candidates include characters and foreign language equivalents, wherein the spelling variation dictionary section shares the characters and foreign language equivalents with the conversion dictionary section and the plurality of spelling variations include synonyms and conjugations of the conversion result candidates, and wherein the support information and spelling variation display set-up section provides selections to always display, to display with a user input, or to not display support information and spelling variations.

3. A symbol sequence conversion system for converting a symbol sequence into an equivalent symbol sequence, said symbol sequence conversion system comprising:

an input unit for inputting the symbol sequence;

a first memory for storing a plurality of possible conversion results and a plurality of first support information, wherein the plurality of first support information includes a corresponding meaning for each of the plurality of possible conversion results;

a second memory for storing a plurality of second support information;

a preferences set-up unit for selecting a plurality of display preference settings, wherein the plurality of display preference settings govern display of each of the plurality of first support information and each of the plurality of second support information;

a memory retrieval means for retrieving ones of the plurality of possible conversion results most likely to be linguistically equivalent to the symbol sequence, and for retrieving ones of the plurality of first support information from the first memory, and for retrieving ones of the plurality of second support information from the second memory;

a display for simultaneously displaying within a window, the ones of the plurality of possible conversion results and the corresponding meaning, and for selectively displaying ones of the plurality of first support information according to the display preference settings, and the ones of the plurality of second support information according to the display preference settings; and a selection control for controlling a plurality of user input commands, wherein one of the plurality of user input commands is a selection command for selecting the equivalent symbol sequence from the group of: the ones of the plurality of possible conversion results, the ones of the plurality of first support information, and the ones of the plurality of second support information.

4. A symbol sequence conversion system according to claim 3, wherein the first memory comprises a conversion dictionary.

5. A symbol sequence conversion system according to claim 3, wherein the plurality of possible conversion results comprise a plurality of characters representing foreign language equivalents of the symbol sequence.

6. A symbol sequence conversion system according to claim 3, wherein the plurality of first support information further comprises an exemplary sentence for each of the plurality possible conversion results.

7. A symbol sequence conversion system according to claim 3, wherein the second memory comprises a spelling variation dictionary.

8. A symbol sequence conversion system according to claim 3, wherein the plurality of second support information comprises spelling variations of each of the plurality of possible conversion results.

9. A symbol sequence conversion system according to claim 8, wherein the spelling variations comprise synonyms of, and conjugations of, each of the plurality of possible conversion results.

10. A symbol sequence conversion system according to claim 3, wherein the plurality of preference settings comprise a setting to always display, a setting to display when directed, and a setting not to display.

11. A symbol sequence conversion system according to claim 3, wherein the symbol sequence is sequentially converted into the equivalent symbol sequence.

12. A symbol sequence conversion method for converting a symbol sequence into an equivalent symbol sequence, said symbol sequence conversion method comprising the steps of:

inputting the symbol sequence and a plurality of user commands;

storing a plurality of possible conversion results and a plurality of first support information in a first memory, wherein the plurality of first support information includes a corresponding meaning for each of the plurality of possible conversion results;

storing a plurality of second support information in a second memory;

setting a plurality of display preference settings according to ones of the plurality of user commands, wherein the plurality of display preference settings govern display of each of the plurality of first support information and each of the plurality of second support information;

retrieving from the first memory ones of the plurality of possible conversion results most likely to be linguistically equivalent to the symbol sequence;

retrieving ones of the plurality of first support information from the first memory;

retrieving ones of the plurality of second support information from the second memory;

simultaneously displaying within a window, the ones of the plurality of possible conversion results and the corresponding meaning, and selectively displaying the ones of the plurality of first support information according to the display preference settings, and the ones of the plurality of second support information according to the display preference settings; and selecting the equivalent symbol sequence from the group of the ones of the plurality of possible conversion results, or the ones of the plurality of first support information, or the ones of the plurality of second support information, according to one of the plurality of user commands.

13. A symbol sequence conversion method according to claim 12, wherein the first memory comprises a conversion dictionary.

14. A symbol sequence conversion method according to claim 12, wherein the plurality of possible conversion results comprise a plurality of characters representing foreign language equivalents of the symbol sequence.

15. A symbol sequence conversion method according to claim 12, wherein the plurality of first support information further comprises an exemplary sentence for each of the plurality possible conversion results.

16. A symbol sequence conversion method according to claim 12, wherein the second memory comprises a spelling variation dictionary.

17. A symbol sequence conversion method according to claim 12, wherein the plurality of second support information comprises spelling variations of each of the plurality of possible conversion results.

18. A symbol sequence conversion method according to claim 17, wherein the spelling variations comprise synonyms of, and conjugations of, each of the plurality of possible conversion results.

19. A symbol sequence conversion method according to claim 12, wherein the plurality of preference settings comprise a setting to always display, a setting to display when directed, and a setting not to display.

20. A symbol sequence conversion method according to claim 12, wherein the symbol sequence is sequentially converted into the equivalent symbol sequence.

* * * * *